US006751758B1

(12) United States Patent
Alipui et al.

(10) Patent No.: US 6,751,758 B1
(45) Date of Patent: Jun. 15, 2004

(54) METHOD AND SYSTEM FOR HANDLING ERRORS IN A DATA STORAGE ENVIRONMENT

(75) Inventors: Gilbert Alipui, Shrewsbury, MA (US); Hagit Britz-Artzi, Framingham, MA (US); Timothy Sharp, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 486 days.

(21) Appl. No.: 09/885,310

(22) Filed: Jun. 20, 2001

(51) Int. Cl.[7] .............................................. G06F 11/00
(52) U.S. Cl. .............................. 714/54; 714/42; 714/57
(58) Field of Search .............................. 714/54, 57, 44, 714/42, 5, 48, 26, 27

(56) References Cited

U.S. PATENT DOCUMENTS

| | | | | | |
|---|---|---|---|---|---|
| 5,720,031 | A | * | 2/1998 | Lindsay ........................ | 714/42 |
| 5,724,542 | A | * | 3/1998 | Taroda et al. ................ | 711/113 |
| 6,438,716 | B1 | * | 8/2002 | Snover ......................... | 714/57 |
| 6,647,383 | B1 | * | 11/2003 | August et al. ................. | 707/3 |
| 6,654,915 | B1 | * | 11/2003 | Lu et al. ....................... | 714/57 |
| 6,662,318 | B1 | * | 12/2003 | Baysah et al. ................ | 714/48 |
| 2002/0083377 | A1 | * | 6/2002 | Clauss et al. ................. | 714/57 |
| 2002/0124213 | A1 | * | 9/2002 | Ahrens et al. ................ | 714/57 |
| 2002/0124214 | A1 | * | 9/2002 | Ahrens et al. ................ | 714/57 |
| 2002/0129305 | A1 | * | 9/2002 | Ahrens et al. ................ | 714/57 |
| 2002/0147946 | A1 | * | 10/2002 | Jaimsomporn et al. ....... | 714/57 |
| 2002/0162057 | A1 | * | 10/2002 | Talagala ....................... | 714/54 |
| 2003/0001892 | A1 | * | 1/2003 | Hartel et al. ................. | 345/762 |

\* cited by examiner

Primary Examiner—Robert Beausoliel
Assistant Examiner—Yolanda L Wilson
(74) Attorney, Agent, or Firm—Robert Kevin Perkins; Leanne J. Fitzgerald; John M. Gunther

(57) ABSTRACT

The present invention is a system and method for providing clarity and simplicity to the task of screening for errors occurring in a data storage system and improving the effectiveness of the response to these errors. The system and method includes and employs a graphical user interface (GUI) for providing clarity and simplicity. Also by constraining entry texts into a controlled entry field, the likelihood of text-entry errors are greatly reduced. Further by providing menu options, simplicity and clarity are improved while likelihood of text-entry errors are also further reduced. Text-entry error checking tools are also provided to further decrease the probability that such errors will occur. The system and method employ a mechanism to allow for remote error screening and responding to the error from a remote location also.

25 Claims, 14 Drawing Sheets

METHOD AND SYSTEM FOR HANDLING ERRORS IN A DATA STORAGE ENVIRONMENT

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to error detection and correction of errors in a data storage environment, and more particularly to a system and method for augmenting and simplifying the task of service professionals who handle such errors for data storage systems.

BACKGROUND OF THE INVENTION

As is known in the art, computer systems generally include a central processing unit (CPU), a memory subsystem, and a data storage subsystem. According to a network or enterprise model of the computer system, the data storage system associated with or in addition to a local computer system, may include a large number of independent storage devices or disks housed in a single enclosure or cabinet. This array of storage devices is typically connected to several computers over a network or via dedicated cabling. Such a model allows for the centralization of data that is to be shared among many users and also allows for a single point of maintenance for the storage functions associated with the many host processors.

The data storage system stores critical information for an enterprise that must be available for use substantially all of the time. If an error occurs on such a data storage system it must be fixed as soon as possible because such information is at the heart of the commercial operations of many major businesses. A recent economic survey from the University of Minnesota and known as Bush-Kugel study indicates a pattern that after just a few days (2 to 6) without access to their critical data many businesses are devastated. The survey showed that 25% of such businesses were immediately bankrupt after such a critical interruption and less than 7% remained in the marketplace after 5 years.

Recent innovations by EMC Corporation of Hopkinton, Mass. provide business continuity solutions that are at the heart of many enterprises data storage infrastructure. Nevertheless, the systems (including devices and software) being implemented are complex and vulnerable to errors that must be quickly serviced for the continuity to be maintained.

EMC has been using a technique for responding to errors as they occur by "calling home" to report the errors. The data storage system is equipped with a modem and a service processor (typically a laptop computer) for error response. Sensors that are built into its storage systems monitor things such as temperature, vibration, and tiny fluctuations in power, as well as unusual patterns in the way data is being stored and retrieved—over 1,000 diagnostics in all. Periodically (about every two hours), an EMC data storage system checks its own state of health. If an error is noted, a machine-implemented "call home" is made to customer service over a line dedicated for that purpose.

Every day, an average of 3,500 such calls home for help reach EMC's customer service center in Hopkinton. About one-third of the calls from EMC's machines trigger the dispatch of a customer engineer to fix some problem. Remarkably under such a service program, many problems are resolved before the owner of the data storage system is even aware that there has been a problem. However, some error codes that result in calls home are the result of known problems for which a design engineering fix is pending, or minor problems that do not require immediate attention. Such calls can be deferred or ignored so that more urgent and important errors may be dealt with. This is known as screening or filtering errors However when filtering errors it is important to not introduce costly mistakes. If the error for which screening is intended is not properly filtered then expensive, wasteful, unnecessary, and burdensome calls back to home continue. If, on the other hand, an important error is wrongly ignored, then that could cause harm. These two situations could occur at the same time flooding the customer service center with unimportant calls while important errors are ignored.

What is needed is a way to screen for known errors occurring in a data storage system in a simple and clear manner, while reducing the risk that mistakes are created. Furthermore, it would be an advancement in the art if such a screening tool could be administered on a remote basis so it could handle data storage systems located anywhere in the world.

SUMMARY OF THE INVENTION

The present invention is a data storage management system and method that includes a simple clearly presented tool for screening out or filtering errors occurring in a data storage system.

In one embodiment, the invention includes a method that is useful in a data storage system with more than one storage device. The method provides steps for the management of errors related to a data storage system. The method includes receiving at an error response station a message about an error related to the data storage system, and providing a graphical user interface (GUI) for enabling the selective entry of error handling information in response to receiving the message. The method may be further useful for suppression of such handling information, diagnosing such messages, and taking or recommending corrective action.

In another embodiment the invention includes a system capable of performing the method and computer-executed logic capable of carrying out the method.

In another embodiment, the above-specified techniques are enabled to be remotely deployed to manage response to errors occurring on data storage systems anywhere in the world.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

The methods and apparatus of the present invention are intended for use in data storage systems, such as the Symmetrix Integrated Cache Disk Array system available from EMC Corporation of Hopkinton, MA and in particular are useful for managing errors that may occur on such a system.

The methods and apparatus of this invention may take the form, at least partially, of program code (i.e., instructions) embodied in tangible media, such as floppy diskettes, are the CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 1:
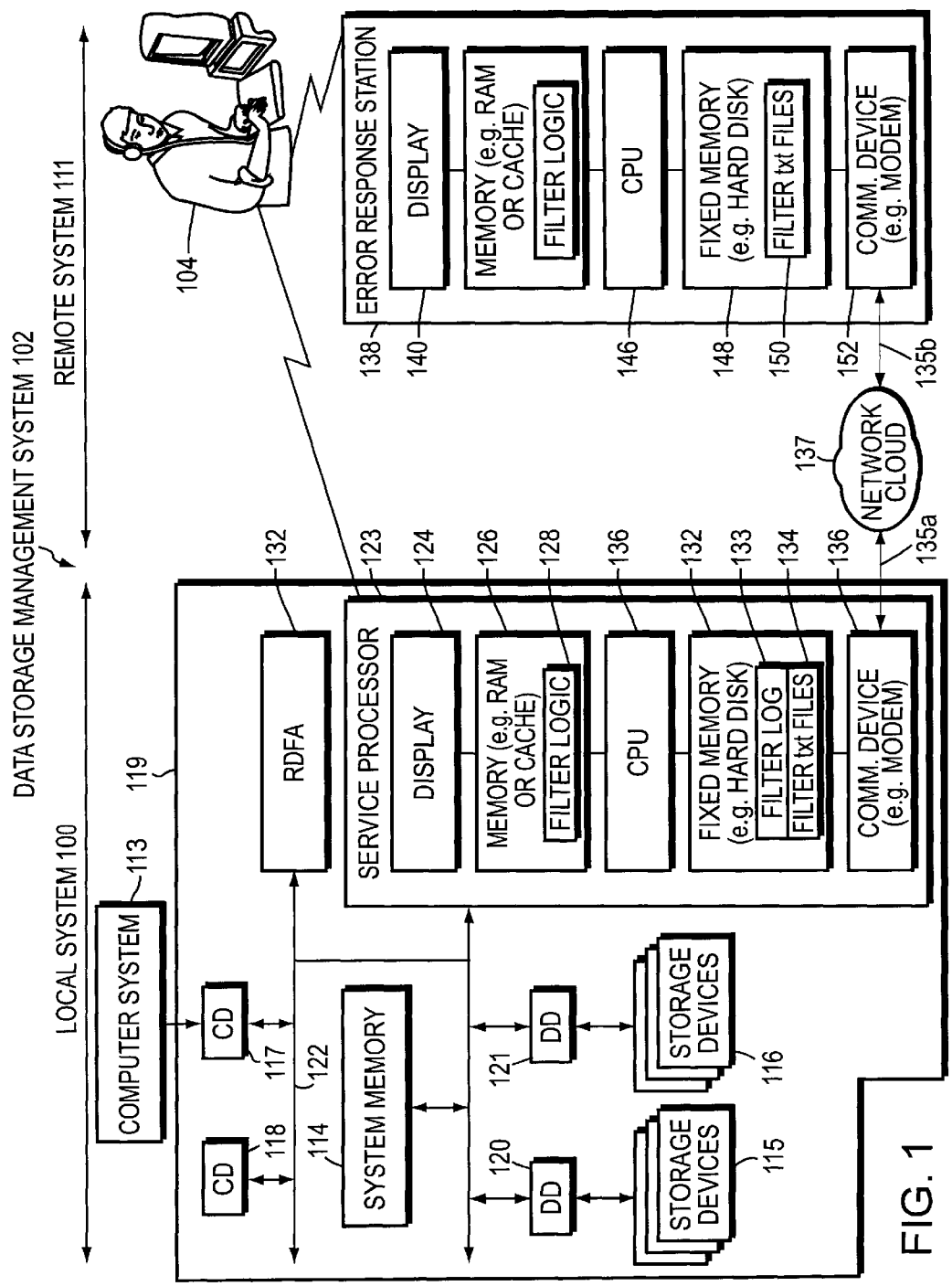
FIG. 1 is a block diagram of a data storage management system including filter logic that operates with the filter log for operating the present invention and including a data storage system, a service processor, and a remote error response station.

The logic for carrying out the method is embodied as part of the Data Storage Management System 102 described below beginning with reference to FIGS. 1–3, and which is useful for implementing a method described with reference to FIGS. 6–11. For purposes of illustrating the present invention, the invention is described as embodied in a specific configuration, but one skilled in the art will appreciate that the device is not limited to the specific configuration but rather only by the claims included with this specification Referring now to FIG. 1, Local System 100 includes a data storage system 119 that in a preferred embodiment is a Symmetrix Integrated Cache Disk Arrays system available from EMC Corporation of Hopkinton, Mass. Such data storage systems and their implementations are fully described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

The local system 100 comprises major components including a computer system 113 formed of a computer processor and the data storage facility 119 that includes a system memory 114 and sets or pluralities 115 and 116 of multiple data storage devices or data stores. The system memory 114 can comprise a buffer or cache memory; the storage devices in the pluralities 115 and 116 can comprise disk storage devices, optical storage devices and the like. The sets 115 and 116 represent an array of storage devices that may be arranged in a variety of known configurations. However, in a preferred embodiment the storage devices are disk storage devices.

Channel directors (CD) 117–118 provide communications between the computer system 113 and the system memory 114; device or disk directors (DD) 120 and 121 provide pathways between the system memory 114 and the storage device pluralities 115 and 116. A bus 122 interconnects the system memory 114, the channel directors 117 and 118 and the disk directors 120 and 121. Remote Data Facility Adapter (RDFA) 132 may provide access along path 112 to an optional remote data storage system (not shown).

System memory 114 is used by various elements within the respective systems to transfer information and interact between the respective channel directors and disk directors. Additionally, a service processor 123 monitors and controls certain operations and provides a primary interface for an external operator to respective systems and may be used for implementing utilities such as a utility for carrying out operations of the present invention.

Logic for carrying out the methods of this invention is preferably included as part of the data storage system 119, and preferably as part of the service processor 123 and also as part of an error response station 138 that is part of a remote system 111. Nevertheless, one skilled in the computer arts will recognize that the logic, which may be implemented interchangeably as hardware or software may be implemented in various fashions in accordance with the teachings presented now.

Generally speaking, the local system 100 operates in response to commands from one or more computer systems, such as the computer system 113, that a connected channel director, such as channel director 117 receives. The channel directors 117 and 118 transfer commands to a command buffer that is part of system memory 114. The command buffer stores data structures and write requests that the channel directors generate. The disk directors, such as the disk directors 120 or 121, respond by effecting a corresponding operation using the information in a command buffer. The selected disk adapter then initiates a data operation.

Reading operations transfer data from the storage devices to the system memory 114 through a corresponding disk adapter and subsequently transfer data from the system memory 114 to the corresponding channel director, such as channel director 117 when the computer system 113 initiates the data writing operation.

The data storage system 119 includes a service processor 123 that communicates along path 122 to the elements of the data storage system. Although the service processor 123 and shown is being an integral part of the data storage system, one skilled the art will recognize that the service processor only needs to be in communication with the data storage system 119 to complete the operations of this invention. Preferably the service processor and the data storage devices are separated by distance of less than 10 meters; however, greater distances may separate them as long as there is communication between the service processor and the data storage system.

The service processor 123 includes filter logic 128 that enables it to operate as a special-purpose digital computer. Complementary filter logic 142 on error response station 138 likewise enables it to operate as a special-purpose digital computer. The filter logic 128 operates in memory 126 (such as conventional electronic memory, for example RAM or cache memory) on the service processor in a cooperative fashion with filter logic 142 that in turn operates in memory 144 of the error response station to enable the method of this invention.

The service processor 123 further includes a display 124, the CPU 130 (e.g., a conventional microprocessor), a fixed memory 132 (e.g., a hard disk), and a communications device 136 (e.g., a modem). That communications device 136 communicates across path 135*a* through network cloud 137 and across path 135*b* to communications device 152 (e.g., a modem) at error response station 138.

Error response station 138 is located in the remote system 111 so that it is remote from the data storage system 119. The complementary filter logic 128 and 142 enable the error response station 138 to be used by the operator 104 to have remote control over the service processor 123. In this fashion, the operator 104 may diagnose, correct, and screen out or filter errors occurring at the data storage system 119. Regarding the remote aspect of the error response station, it is preferred that the error response station and the data storage devices of data storage system 119 are separated by distance of at least one kilometer.

The error response station 138 also includes a display 140, memory 142 (such as conventional electronic memory, for example RAM or cache memory), a CPU 146 (e.g., a conventional microprocessor), and a fixed memory 148 (e.g., a hard disk).

Referring again to the service processor 123 (FIG. 1), the fixed memory 132 is provided with special information data and files that are used by the respective filter logic elements when 128 and 142 for caring out the method of this invention. A special file for keeping track of "filtering" commands is denoted as the filter.log 133. One or more text files denoted as Filtertxtfiles 134 may be used as templates for inserting commands in filter.log 133. Filtertxtfiles 134 may be directly inserted in the filter.log and are operated on by the INCLUDE or EXCLUDE statement discussed with reference to FIG. 6–11 below. Similarly, Filtertxtfiles 150 may be stored in fixed memory 148 for similar purpose as Filtertxtfiles 134 for the convenience of operator 104 using the error response station 138 in a stand-alone, i.e. non-remote controlling fashion over service processor 123.

Figure 2:
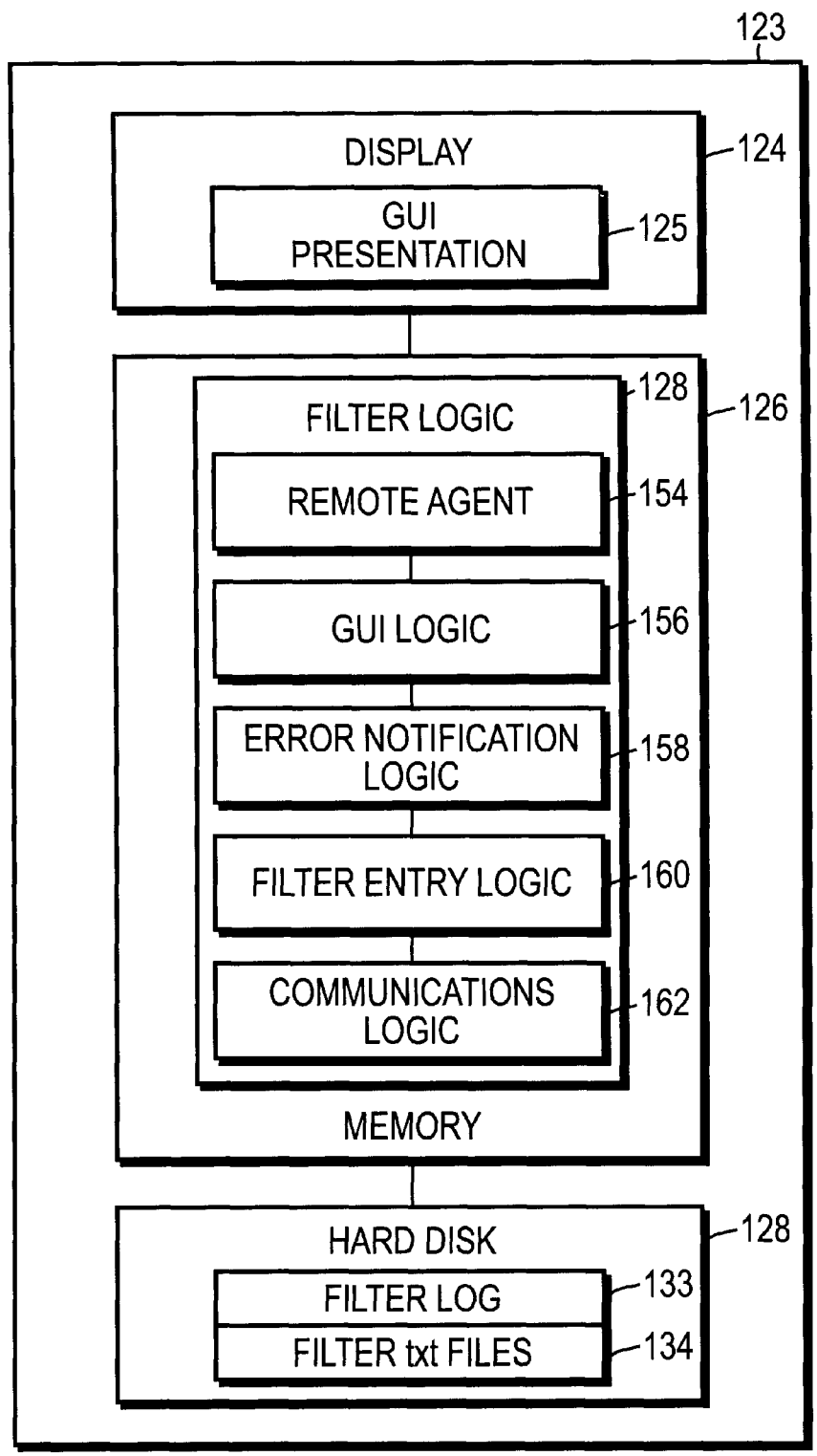
FIG. 2 is a block diagram of the architecture for the logic shown in FIG. 1 as implemented on the service processor of FIG. 1.

FIG. 2 shows further detail regarding service processor 123. Filter logic 128 operates in memory 126 and includes several interoperating logic modules 154–162. All of the logic modules are preferably implemented as software. The modules include a remote agent 154, GUI logic 156, error notification logic 158, error handling information logic herein denoted as filter entry logic 160, and communications logic 162.

Figure 3:
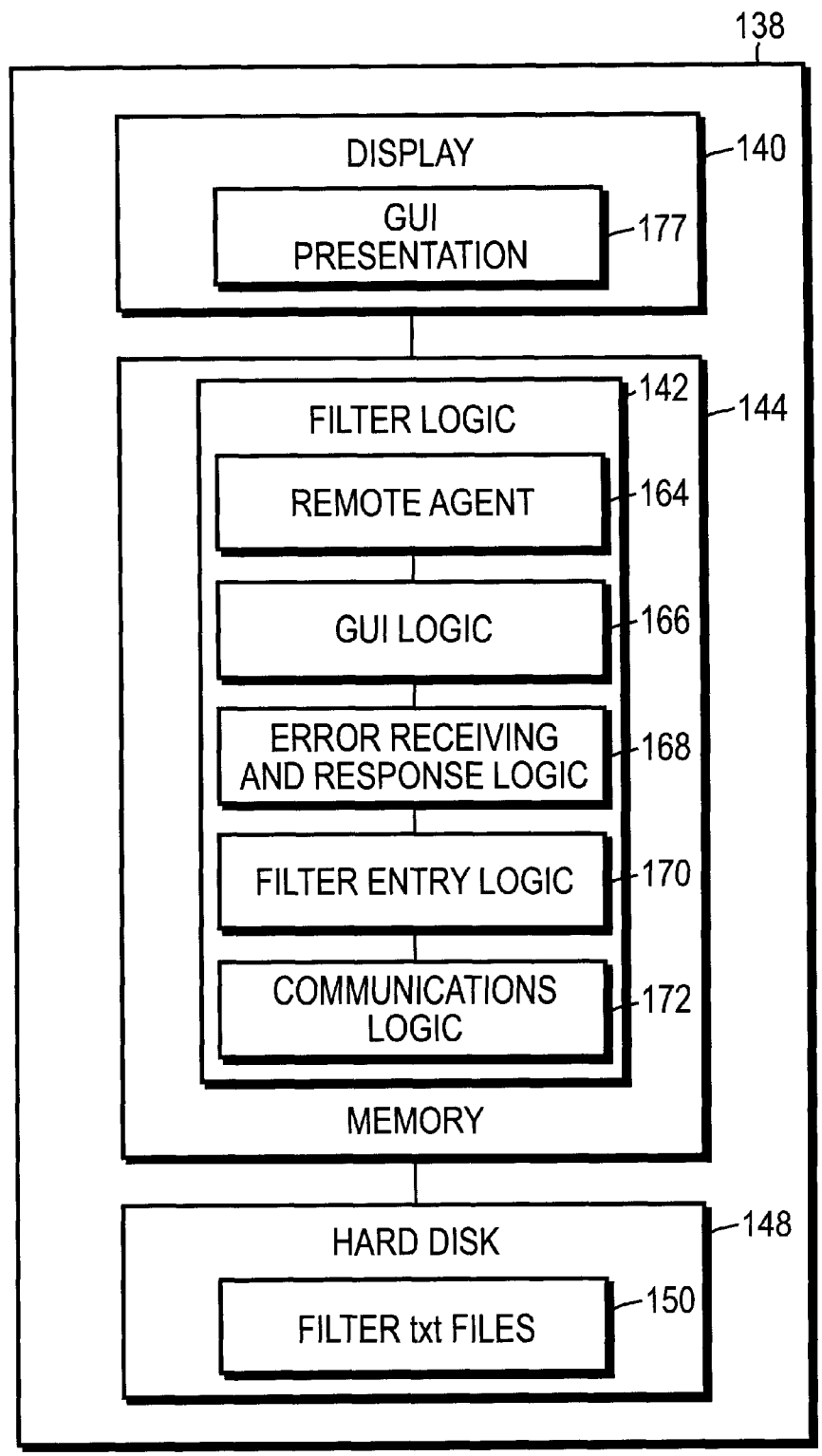
FIG. 3 is a block diagram of the architecture for the logic shown in FIG. 1 as implemented on the error response station of FIG. 1.

FIG. 3 shows further detail regarding service processor 138. Filter logic 142 operates in memory 144 and includes several interoperating logic modules 164–172. All of the logic modules are preferably implemented as software. The modules include a remote agent 164, GUI logic 166, error message or notification logic 168, error handling information logic herein denoted as filter entry logic 170, and communications logic 172.

Referring to FIGS. 2–3, the remote agent 154 may be an integrated or separate module from the other modules. The remote agent 154 acts in cooperation with remote agent 164 that is part of filter logic 139 that operates in memory 138 of the error response station 134. The remote agents 154 and 164 are each implemented preferably as software, such as the SymmRemote software offered by EMC Corp. of Hopkinton, Mass.

Referring to the error response station 134 (FIG. 3), The GUI logic 166 enables a GUI presentation 147 on display 136, examples of which are shown in FIGS. 12–16. The GUI presentation or tool 147 can be used by operator 104 working at error response station 138 to make changes directly to filter.log 133 to filter errors occurring at data storage system 119. Since the operator has remote control over the service processor 123 when using the GUI tool 147 he may select Filtertxtfiles 134 for inclusion in the filter.log for reasons that will become clearer upon reading the sections referring to the flowcharts (FIGS. 6–11) describing the method. When the operator saves the filter.log after using the GUI tool 147 presented on display 136 of error response station 138, it is saved in fixed memory 128 in filter.log 133.

The GUI logic 166 may be an integrated or separate module from the other modules. It is implemented preferably as software such as the SymmWin software by EMC Corp. of Hopkinton Mass. Conveniently, the SymmWin software provides a graphical user interface that operates in cooperation with the Windows operating system provided by Microsoft Corp. of Redmond Wash.

Service processor 123 also includes GUI logic 156 for presenting a graphical user interface 125 on display 124. This allows the GUI tool to be used with the filter entry logic 160 for a field engineer (not shown) operating on the data storage system independence from an operator at the error response station.

Referring again to FIGS. 2–3, error message or notification logic 158 sends a signal using communications logic 162 through communications device 136 that an error has occurred at data storage system 119. The error message or notification is received through the communications device 152 in cooperation with communications logic 172 by error receiving and response logic 168 on error response station 134. The errors are coded so that the operator 104 may look up the error and attempt to debug the problem. If the error is of the type that is a likely candidate for filtering, then the operator may use filter entry logic 170 that cooperates with GUI logic 166 to enable the operator to make an entry into the filter.log 133.

The types of errors that may be filtered are those that are determined to be unimportant, or one for which a solution is pending, usually because the engineering group has become involved and is making an engineering change, such as a microcode revision.

Several detailed examples are explained herein; however, it should be understood that this invention is not limited to the particular illustrative examples explained. Rather, this invention that provides a novel and inventive system and process for managing errors occurring on data storage system should only be limited by the claims appended below.

Figure 4:
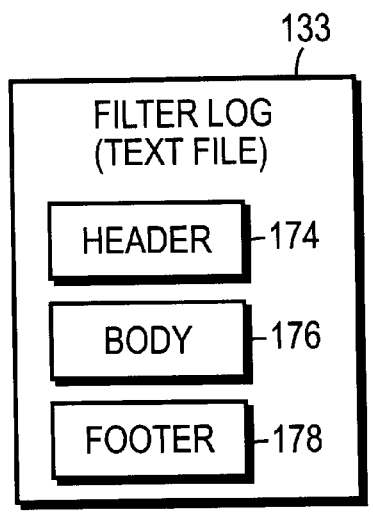
FIG. 4 is a schematic representation of contents comprising the filter log of FIG. 1.
Figure 5:
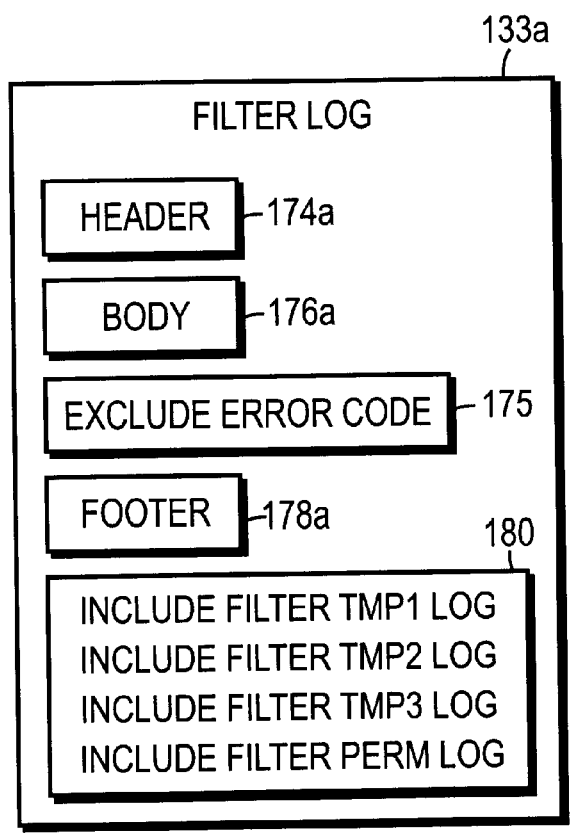
FIG. 5 is in a schematic representation of contents comprising an embodiment of the filter log of FIGS. 1 and 4.
Figure 6:
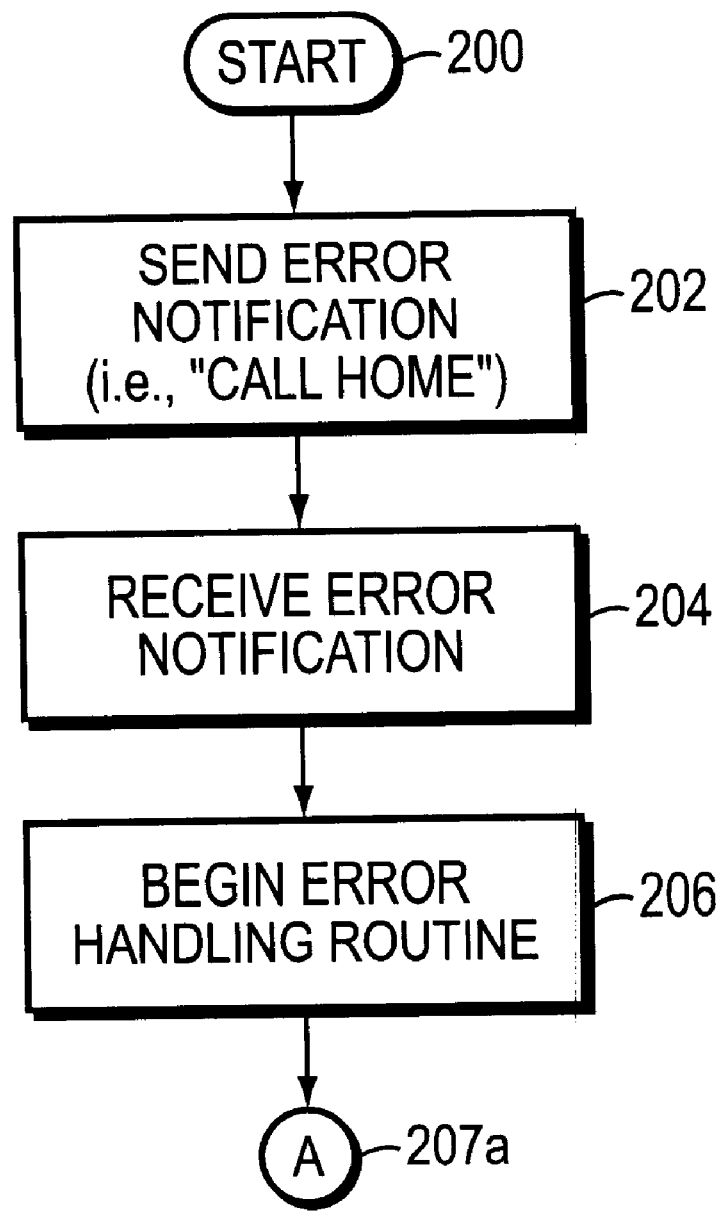
FIG. 6 is a flow logic diagram of the method of this invention using the filter logic and filter log on the system of FIG. 1.

FIGS. 4 and 5 show the contents of filter.log 133. The file is preferably a text file, including a Header 174, a Body 176 and Footer 178. The Header includes introductory information and Footer precedes a group 180 of INCLUDE statements that cause the insertion of many Filtertxtfiles 134. FIG. 5 shows an exemplary illustration of the contents of filter.log 133 after being operated upon by operator 104 using GUI tool 147. The example "EXCLUDE ERROR CODE" statement 175 is part of the Body 176a. When such an EXCLUDE statement 175 is encountered, the filter logic prevents a normal "call home" for the particular error identified by the particular error code. Any of the Filtertxtfiles 134 may have EXCLUDE statements embedded in them, all of which will be encountered when the filter.log 133a is processed.

The process of filtering errors and filter logs existed prior to the creation of this invention. But the inventors of this invention critically recognized that prior to the creation of the present invention, there was no easy simple way to create entries into a filter log without a significant risk of the operator making mistakes. Such mistakes would result in critical errors being ignored and/or the call center being flooded with calls that should have been deferred or ignored by correctly implemented filtering process.

For example, at EMC, prior to this invention, any changes to a filter log had to be made by laboriously editing a file containing one-character field representations of critical bytes that were arranged contiguously. Each of these critical bytes are known as "sense bytes," which are specific areas reserved in the memory data storage system 119 for identifying and handling errors. For example, a certain type of error, identified as the "0467" error has sense bytes 12 and 13 reserved for its identification and handling.

Following, in Table 1, is a representation of sense bytes 00–21 with information placed in their respective information fields for indicating how to handle certain errors:

TABLE 1

00\_\_\_02\_\_\_04\_\_\_06\_07\_08\_\_\_\_\_11\_12\_\_\_\_\_15\_16\_\_\_18\_19\_20\_21
??????????DDDCCH ?? ADADADAD SKFFYYYY ???? AQ ?? PP IN
  wherein, for example,
  GDP = DEVICE
  CCC = CYLINDER
  H = HEAD
  ADADADAD = ADDRESS FOR MEMORY ERRORS
  ? = BYTE NOT USED ( Mask representing 0–F (Hex))

Under program control the sense bytes are interpreted to determine which error is present and any specific information related to it. However, one skilled in the art will appreciate the ease with which errors may be introduced. For example, the mere placement of information one or more places off in the information fields will change the interpreted meaning entirely. It can be appreciated that it would be very easy to introduce an error that would produce the kind of problems described above, especially when one considers that the operator attempting to handle such problems has responsibility for dealing with multiple calls from multiple data storage systems from locations all over the world.

Figure 12:
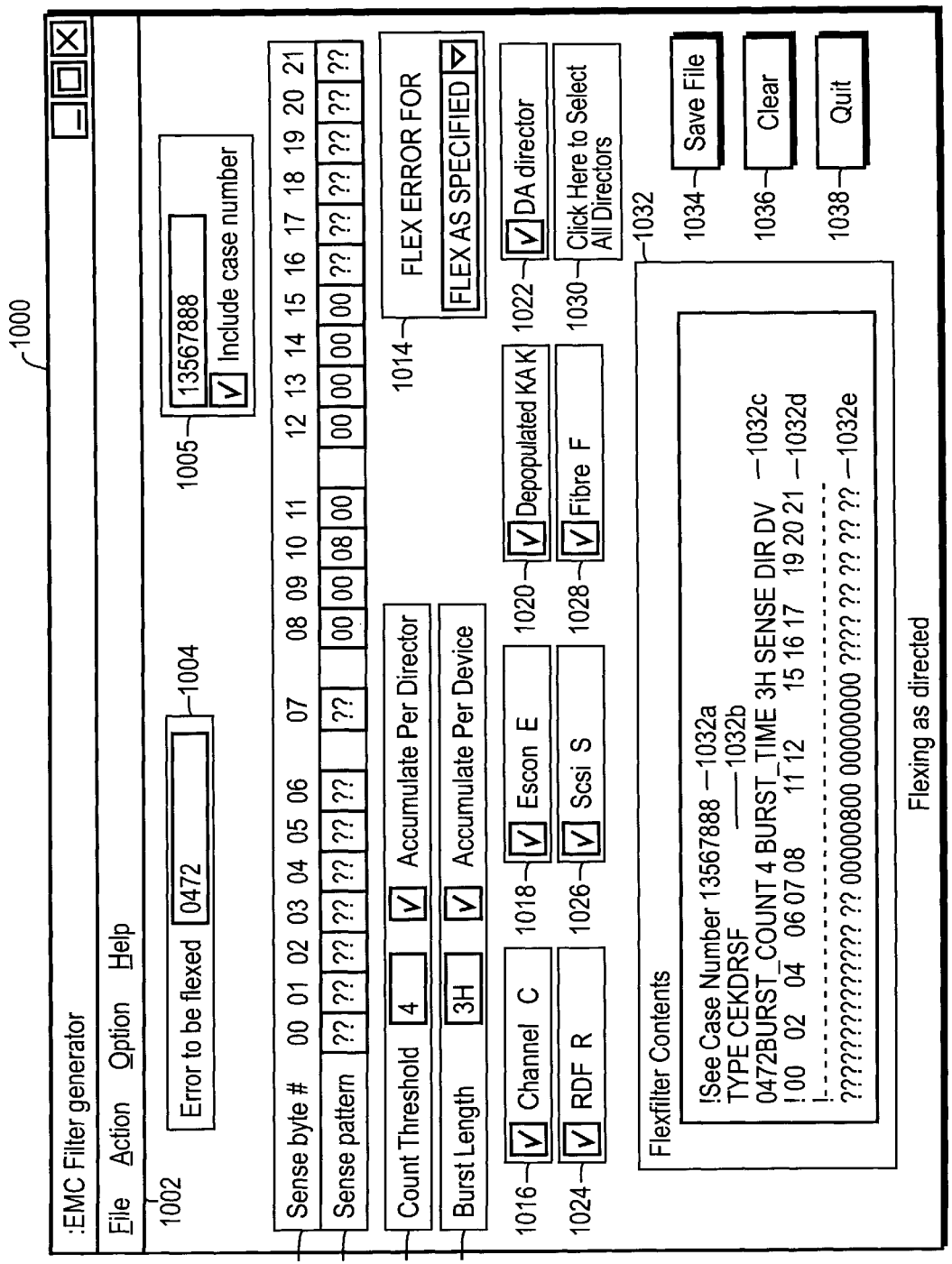
FIG. 12 is an example of a graphical user interface (GUI) tool useful for creating an error handling information denoted as a filter entry for the filter log of FIG. 1 and useful for the method shown in FIGS. 6–11.

FIG. 12 illustrates how such sense bytes are handled using the present invention and is now explained with comparison to prior art techniques. Referring now to FIG. 12, in this example the GUI presentation 147 is shown as display screen presentation capture 1000 (hereafter screen 1000). The flex filter contents box 1032 shows the contents of the filter.log created using the GUI tool of this invention. It shows similar information as that described above referenced in Table 1, but the operator is given a much clearer and simpler way of manipulating the information fields than in with prior art techniques.

Referring again to FIG. 12, and box 1032, line 1032a shows the case number for identification purposes, line 1032b shows the type of error, in this example "CEKDRSF," meaning in this case the error applies to all of the directors in data storage system 119. Errors may be excluded on a device or director level and each of the fields 1016–1028 provide a way for the operator 104 to indicate which action should be taken. In this example, the letter C stands for "Channel." The letter E stands for "ESCON." The letter K indicates a special configuration regarding the amount of devices in storage system 119. The letter D indicates a device or disk director. The letter R indicates a remote device facility adapter. The letter S indicates SCSI. The letter F Indicates Fibre. If for example, the error were only to be excluded from requiring a call home if it dealt with a specific director or device or channel then only the appropriate box on the GUI presentation would be checked. Alternatively, field 1030 may be used to select that the error be excluded from calling home for all directors.

Referring again to FIG. 12, line 1032c shows the particular error code 0472 and also indicates the quantification threshold that is acceptable before this error requires a call home. The threshold in this example is indicated by BURST_COUNT 4 and BURST_TIME 3H. In this example, this means the error may occur four times within a three-hour timeframe without requiring a call home. However if the error occurred for a 5th time within this same three-hour team timeframe, then a call home would be required. Furthermore, line 1032c shows that the threshold is accumulated per director and per device is indicated by the following text "SENSE DIR DV."

Line 1032e shows the sense pattern for each sense byte, wherein each sense byte relates to byte of information that is used to actually indicate which errors to exclude or ignore.

Referring now to FIG. 12, Screen 1000 includes a menu bar 1002 with menu selections File, Action, Option, and Help. Field 1004 on the GUI screen 1000 may be used to indicate which error code should be filtered. Regarding terminology, such an action may also be known as "flexing" an error. Hence field 104 is labeled "Error to be flexed." In this example, the error to be flexed is 0472. Conveniently, field 1005 may be used to include an identifying case number. Field 1006 is used to indicate identification for each sense byte number (#) that may be involved in flexing the error. Field 1010 is used to indicate the count threshold and whether to accumulate per director. Likewise field 1012 is used to indicate the burst length and whether to accumulate per director. Field 1014 is a field for offering menu selections to indicate how the error will be flexed. Examples of such menu options shall be shown in the example figures of screen 1000 below.

The operator may save the file by clicking on Field 1034. Although the operator can see the GUI presented on error response station 138, in fact the filter.log 133 is saved on the hard disk 128 of the service processor 123 such that errors can be filtered occurring on data storage system 119. This remote aspect provides an important advantage of this invention over the prior art.

The GUI tool also provides an important advantage over the prior art. An important aspect of the GUI tool is that the entry fields for the sense bytes for data being interrelated to the filter entry are constrained to follow a predetermined format. This greatly minimizes the risk of inadvertent errors being introduced by the filter entry process. The GUI tool includes menu options for inputting data related to the filter entry that also provides another important advantage over the prior art. The GUI tool is supported by filter logic which is computer-executable and which checks for text entry errors in accordance with predetermined conventions.

The method is now described with reference to FIGS. 6–11. The process starts its step 200. In step 202 an error notification is sent by the service processor to indicate that an error has occurred at data storage system 119. This error notification is also referred to as a "call home." The error notification is received in step 204 by the filter logic 142 in error response station 138. The error handling routine begins in step 206. The continuation step 207a connects with 207b (FIG. 7).

Figure 7:
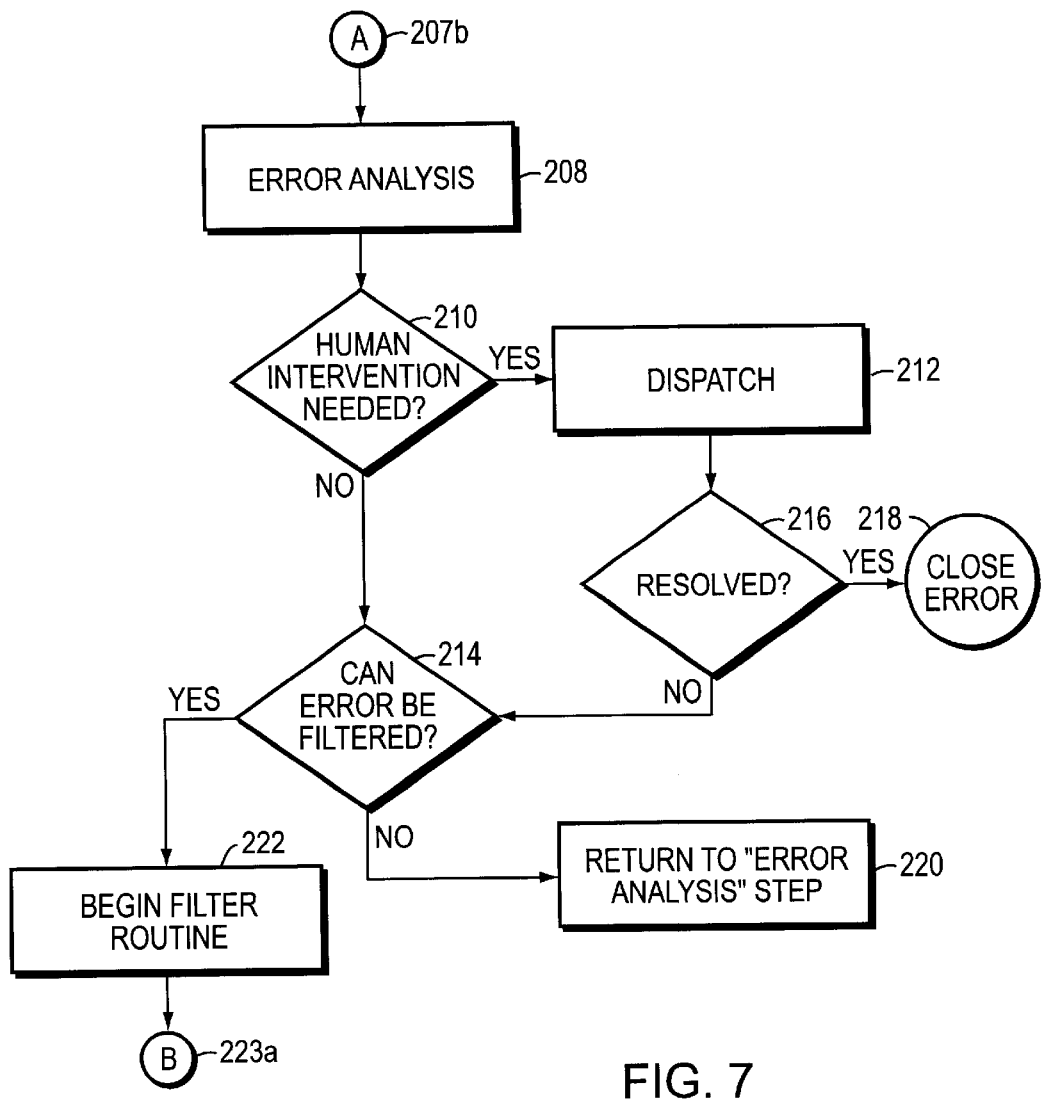
FIG. 7 is another flow logic diagram and is a continuation of the illustration of the method begun in FIG. 6.

Error analysis begins in step 208 (FIG. 7). An inquiry in step 210 poses the question whether human intervention is needed. The operator 104 answers this question. If the answer is "yes" a customer service engineer is dispatched in step 212. But if the answer is "no," than the operator determines whether they error can be filtered in step 214. If the answer to that question is "no," then the process turns to the beginning of the error analysis routine beginning in step 208. But if the answer is "yes," then the filter routine is began in step 222. The continuation step 223a connects with 223b (FIG. 8).

Figure 8:
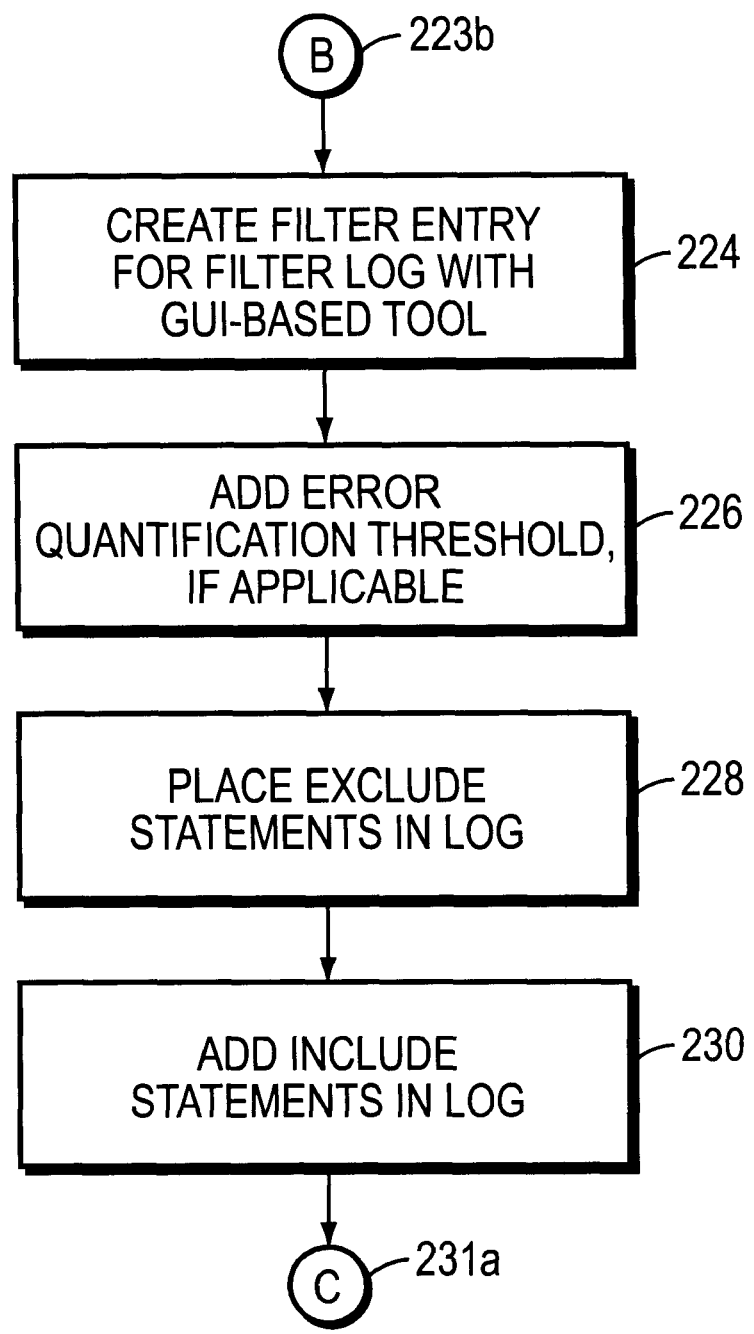
FIG. 8 is another flow logic diagram and is a continuation of the illustration of the method begun in FIG. 6.
Figure 9:
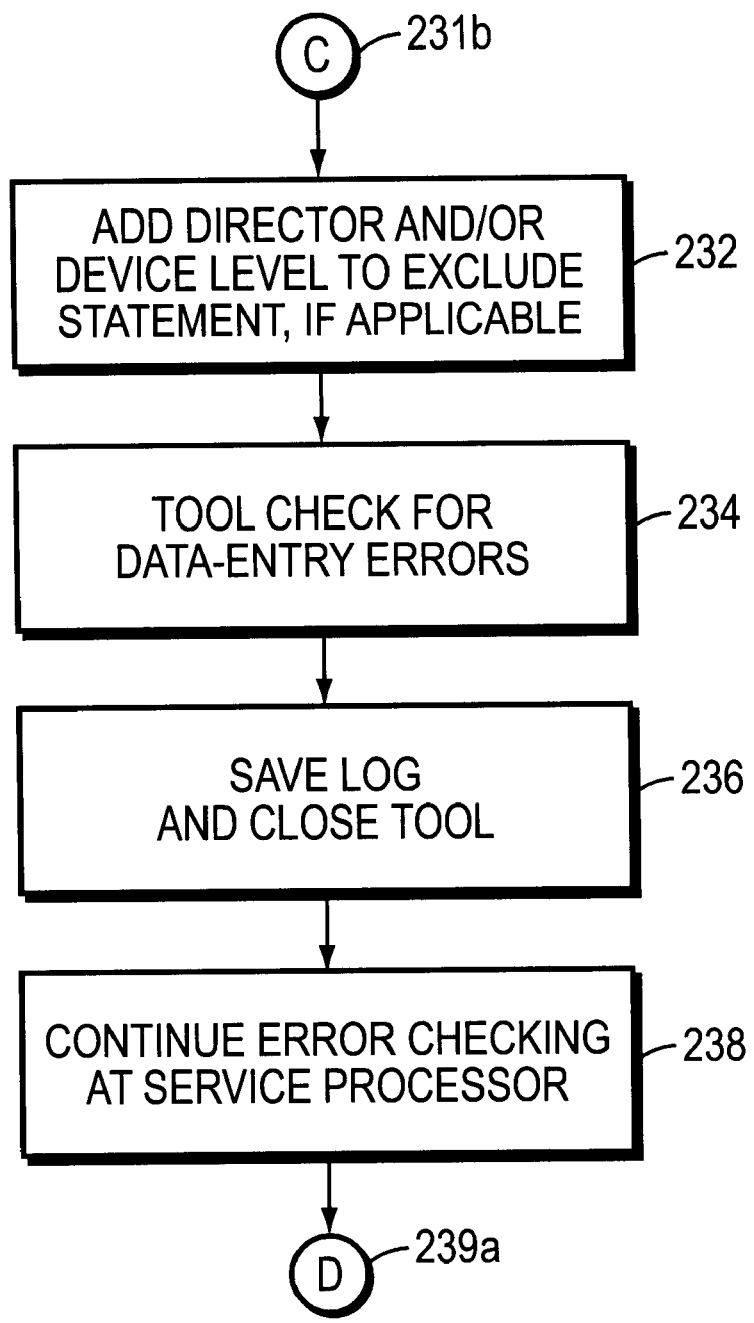
FIG. 9 is another flow logic diagram and is a continuation of the illustration of the method begun in FIG. 6.

The operator may create a filter entry for the filter log with the GUI based tool in step 224 (FIG. 8). If applicable the operator may add an error quantification threshold in step 226. In step 228, the operator may further use the GUI based tool to place EXCLUDE statements in the log as described above. Any INCLUDE statements are placed in the log in step 230. The continuation step 231a connects with 231b (FIG. 9).

Using the GUI based tool, the operator may add a director and/or device level EXCLUDE to the EXCLUDE statements if applicable in step 232. The filter logic invokes checking for data entry errors in step 234. In step 236 the operator uses field 1034 (FIG. 12) to save the filter.log. This action saves the filter.log 133 on the service processor 123, even though the action was presented on the display 140 of station 138. This is part of the remote aspect of this invention. Error checking, which includes error filtering may now continue at the service processor in step 238. The continuation step 239a connects with 239b (FIG. 10).

Figure 10:
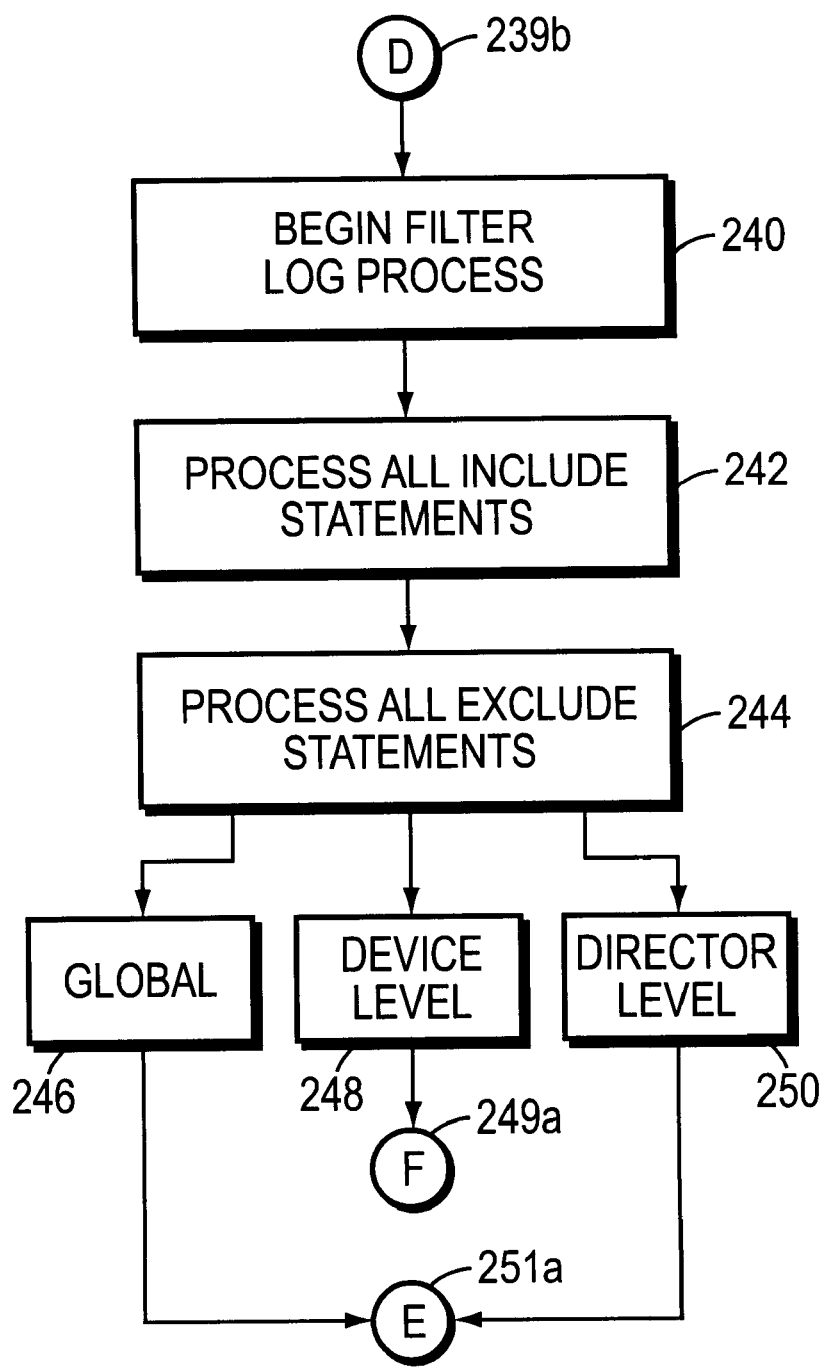
FIG. 10 is another flow logic diagram and is a continuation of the illustration of the method begun in FIG. 6.

The filter log process begins in step 240 (FIG. 10). All INCLUDE statements are processed in step 242, and all EXCLUDE statements are processed in step 244. The INCLUDE statements process Filtertxtfiles such as those in group 180 (FIG. 5) which may cause EXCLUDE statements to be added to the filter.log. Error codes may be excluded on a global, device or director level as shown in respective steps 246, 248 and 250. The continuation steps 251a and 249a connect with 251b and 249b, respectively (FIG. 11).

Figure 11:
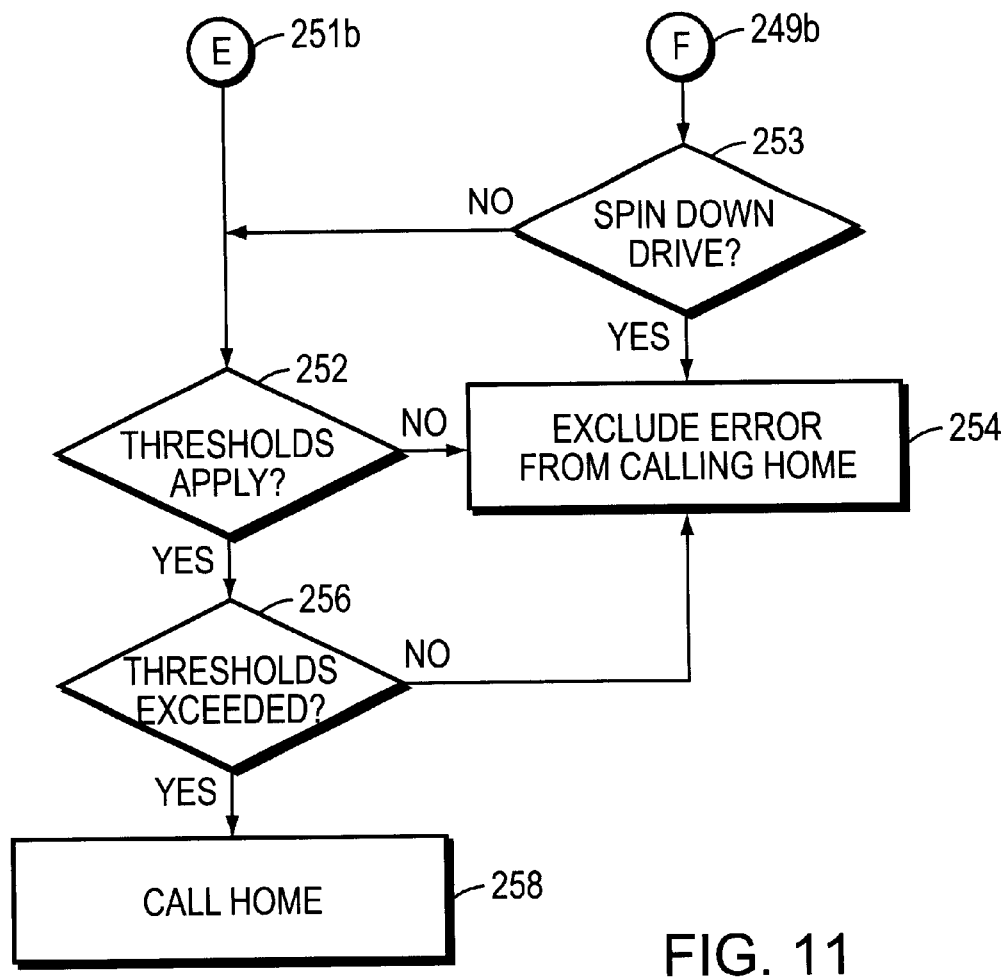
FIG. 11 is another flow logic diagram and is a continuation of the illustration of the method begun in FIG. 6.

Referring to FIG. 11, if the exclusion is on a device level (e.g., a disk drive), then the device may be made inoperable and all errors excluded for this device. Thus, in step 253 a query is posed to determine whether, in this example, a disk drive should be spun down, i.e., stopped. If the answer is "yes," then all calls for errors related to that disk drive are prevented from causing a call home, in step 254. If the answer is "no," then in step 252, a query is posed to determine whether thresholds apply in step 252. Step 252 is reached directly, without doing step 253, if the exclusion is at the director or global level and not the device level. Regardless, if the answer to the question of step 252 is "no," then the error is excluded from calling home (step 254). If on the other hand the answer is "yes," then another question is posed to determine whether thresholds have been exceeded in step 256. If the answer is "no," then the error is excluded from calling home (step 254). ). But, if on the other hand, the answer is "yes," then the call is made for the error in step 258.

Figure 13:
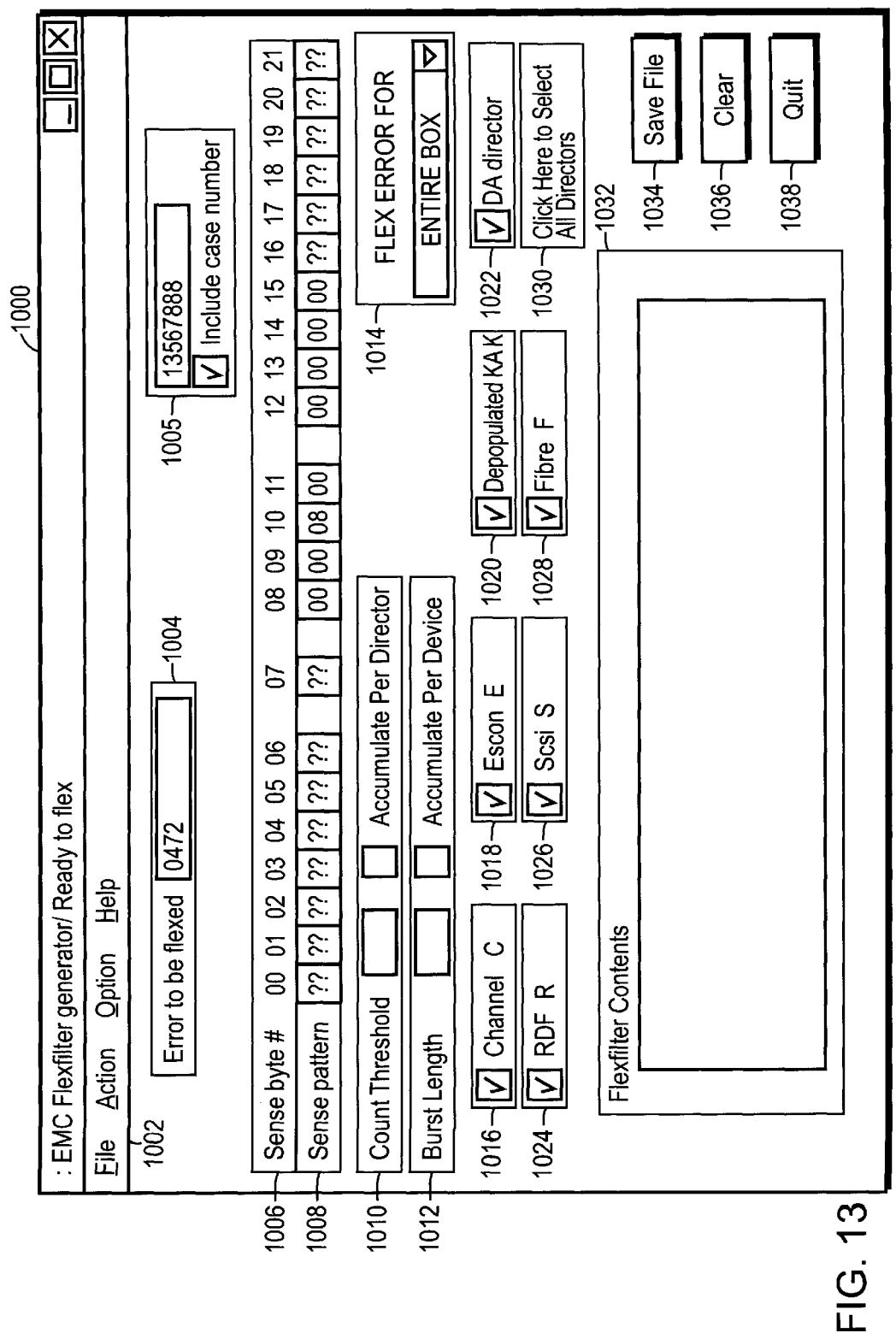
FIG. 13 is another example of a graphical user interface (GUI) tool useful for placing error handling information in the filter log of FIG. 1 and useful for the method shown in FIGS. 6–11.
Figure 14:
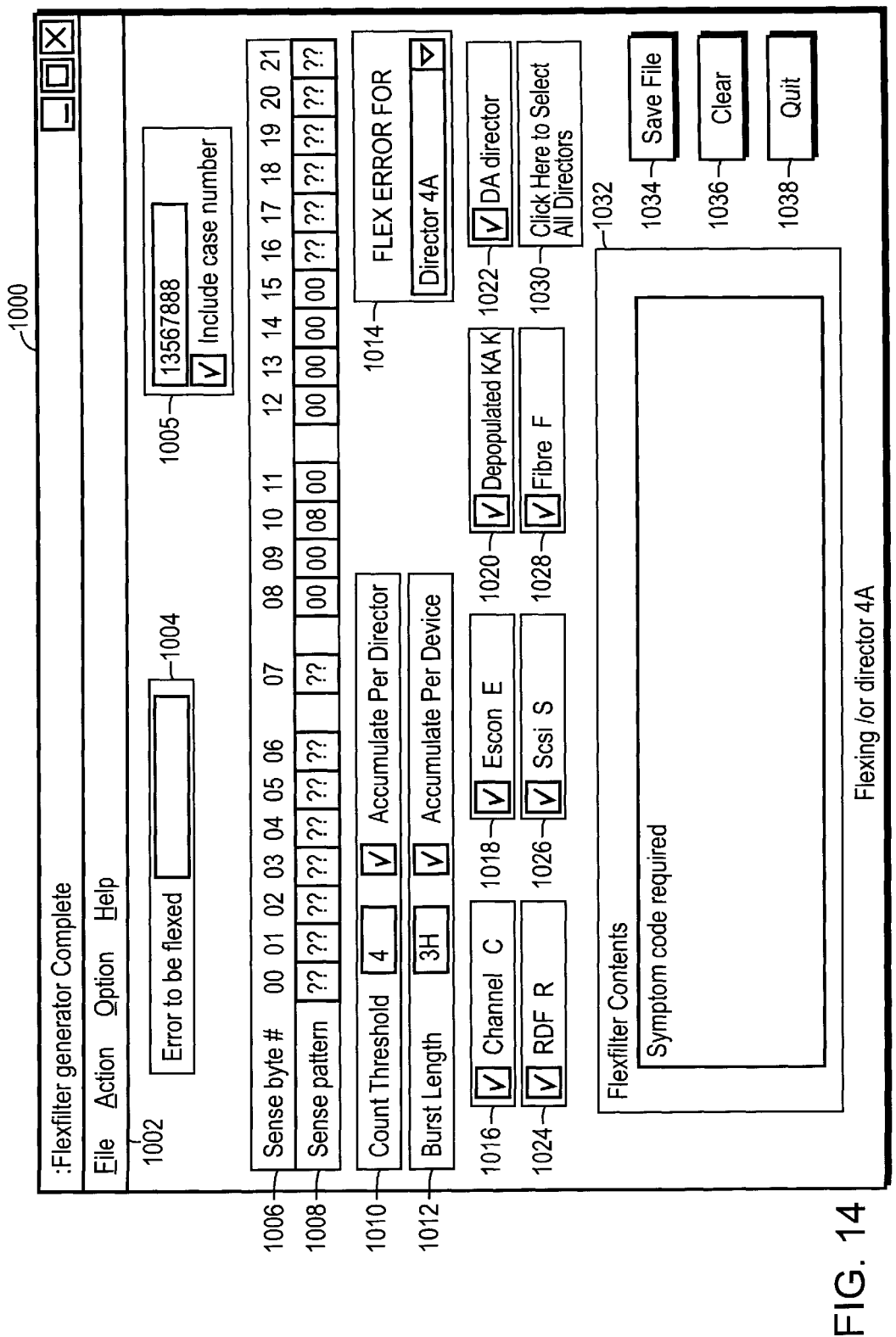
FIG. 14 is another example of a graphical user interface (GUI) tool useful for placing error handling information in the filter log of FIG. 1 and useful for the method shown in FIGS. 6–11.
Figure 15:
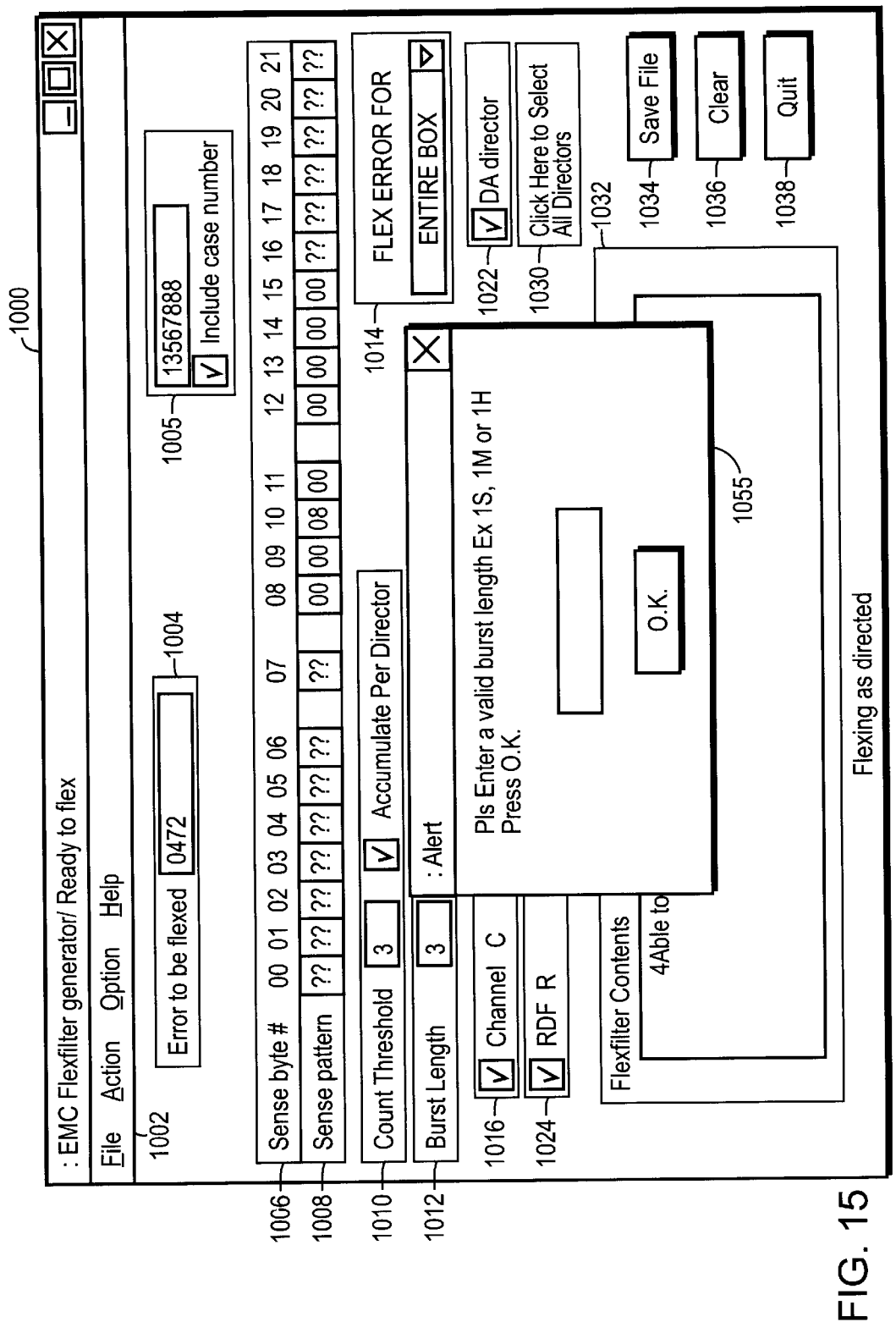
FIG. 15 is another example of a graphical user interface (GUI) tool useful for placing error handling information in the filter log of FIG. 1 and useful for the method shown in FIGS. 6–11.

Additional visual representations of different information appearing on screen 1000, shown in FIGS. 13–15, further illustrate advantages provided by this invention. FIG. 13 shows a configuration of screen 1000 wherein the menus of filed 1014 presented by the GUI have been used to indicate that exclusions are to be performed globally (denoted as "entire box" in this example).

FIG. 14 shows a configuration of screen 1000, and wherein in this example the menus of field 1014 exclude errors on a director level (denoted as "Director 4A" in this example).

FIGS. 14 and 15 each demonstrate the error checking ability of this invention. In FIG. 14, an error message "Symptom code required in field 1032," is presented because in this example shown on screen 1000 has a blank entry in field 1004. An alert error message 1050 is presented on screen 1000 of FIG. 15 because the burst length is entered without time units, e.g. seconds (S), minutes (M), or hours (H) and the operator is also given a chance to fix the entry error.

A system and method has been described for managing errors occurring in a data storage system. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. In a data storage system having a plurality of storage devices and that is in communication with an error response station remotely located from the data storage system, a method for handling at least one error related to the data storage system, the method comprising the steps of:

receiving at an error response station a message about an error related to the data storage system; and providing a graphical user interface (GUI) useful for entering error handling information in response to receiving the message, wherein information on the GUI presented on the error response station includes information residing on a service processor that has memory and is located proximate to the data storage system and is in communication with the data storage system, such that when the error handling information is indicated as being saved on the GUI it is saved in the memory of the service processor.

2. The method of claim 1, wherein the error handling information includes information regarding an acceptable error quantification threshold for a particular error identified by an error code wherein the threshold is a determining factor regarding whether the particular error may be excluded from a process of calling the error response station to report the particular error.

3. The method of claim 2, wherein the error handling information includes information regarding a device adapter for which the error handling information is related.

4. The method of claim 3, wherein the acceptable quantification threshold is related to the device adapter for which the error handling information is related.

5. The method of claim 2, wherein the acceptable quantification threshold specifies an acceptable amount of error occurrence over a specified period of time.

6. The method of claim 1, wherein the error handling information includes information regarding a device adapter for which the error handling information is related.

7. The method of claim 1, wherein the service processor and the data storage devices are separated by a distance of less than 10 meters.

8. The method of claim 7, wherein the error response station and the data storage devices are separated by a distance of at least 1 kilometer.

9. The method of claim 1, wherein the data storage devices include at least one disk drive and further including the step of spinning down the at least one disk drive and disabling an ability to send error messages related to the at least one disk drive to the error response station.

10. The method of claim 1, wherein the GUI contains a at least one entry into which error handling information must be entered to require a predetermined format for such information.

11. The method of claim 10, wherein the GUI includes menu options for inputting data related to the error handling information.

12. The method of claim 10, wherein the GUI is supported by logic that checks for text entry errors in accordance with predetermined conventions.

13. A computer system comprising:
a data storage system including a plurality of storage devices in communication with a service processor that has memory and is located proximate to the data storage system;
an error response station that is located remote to the data storage system and that is in communication with the service processor; and
computer-executable logic that enables:
receiving at the error response station a message about an error related to the data storage system; and
providing a graphical user interface (GUI) useful for entering error handling information in response to receiving the message wherein information on the GUI presented on the error response station includes information residing on the service processor, such that when the error handling information is indicated as being saved on the GUI it is saved in the memory of the service processor.

14. The computer system of claim 13, wherein the error handling information includes information regarding an acceptable error quantification threshold for a particular error identified by an error code wherein the threshold is a determining factor regarding whether the particular error may be excluded from a process of calling the error response station to report the particular error.

15. The computer system of claim 14, wherein the error handling information includes information regarding a device adapter for which the error handling information is related.

16. The computer system of claim 15, wherein the acceptable quantification threshold is related to the device adapter for which the error handling information is related.

17. The computer system of claim 13, wherein the error handling information includes information regarding a device adapter for which the error handling information is related.

18. The computer system of claim 13, wherein the acceptable quantification threshold specifies an acceptable amount of error occurrence over a specified period of time.

19. The computer system of claim 13, wherein the service processor and the data storage devices are separated by a distance of less than 10 meters.

20. The computer system of claim 19, wherein the error response station and the data storage devices are separated by a distance of at least 1 kilometer.

21. The computer system of claim 13, wherein the data storage devices include at least one disk drive and further including the step of spinning down the at least one disk drive and disabling an ability to send error messages related to the at least one disk drive to the error response station.

22. The computer system of claim 13, wherein the GUI contains a least one entry into which data related the error handling information must be entered thereby constraining entry text related to the error to follow a predetermined format.

23. The computer system of claim 22, wherein the GUI includes menu options for inputting data related to the error handling information.

24. The computer system of claim 22, wherein the GUI is supported by logic which checks for text entry errors in accordance with predetermined conventions.

25. A computer program product for use with a data storage system having a plurality of storage devices and which is in communication with an error response station, the computer program product being for management of error handling occurring within the data storage system, the computer program product comprising:
computer-executable logic contained on a computer-readable medium and which is configured for causing the following computer-executed steps to occur:
receiving at an error response station a message about an error related to the data storage system: and
providing a graphical user interface (GUI) useful for entering error handling information in response to receiving the message wherein information on the GUI presented on the error response station includes information residing on the service Drocessor, such that when the error handling information is indicated as being saved on the GUI it is saved in the memory of the service processor.

* * * * *